May 2, 1967   J. P. BENSA   3,317,766
SYNCHRONOUS MOTORS
Filed May 18, 1964   2 Sheets-Sheet 2

United States Patent Office 3,317,766
Patented May 2, 1967

3,317,766
SYNCHRONOUS MOTORS
Jacques Paul Bensa, Neuilly-sur-Seine, France, assignor to Berex Establishment, Vaduz, Liechtenstein, a company
Filed May 18, 1964, Ser. No. 368,078
Claims priority, application Switzerland, May 21, 1963, 6,397/63
2 Claims. (Cl. 310—163)

This invention relates to improvements in or relating to synchronous motors and is concerned more particularly with means adapted to impart the self-starting characteristic under load to synchronous motors comprising a rotor consisting of a ferrite magnet.

It is known that synchronous motors of this character have the advantageous feature of having a high synchronous torque due to the presence of the ferrite rotor which is practically free of demagnetization. Although motors of this type can start under no-load conditions due to a special arrangement of the stator magnetic circuit, their starting torque is not sufficient to withstand relatively heavy loads.

It is the essential object of the present invention to avoid this serious drawback of synchronous motors.

According to this invention there is provided a synchronous motor of which the rotor comprises a cylindrical magnet of ferrite or like material, characterized in that the rotor shaft carries in addition a member adapted to produce a high starting torque when the rotary magnetic induction field is caused to pass therethrough.

This additional member may consist of a disc or ring of magnetic material cut substantially to a spider configuration having at least three arms. This disc may be made preferably from cobalt or cobalt-vanadium rolled magnetic steel having approximately the following characteristics: $H_c = 300$ oe. (coercitive force) and $B_r = 8,000$ G (remanent induction).

The member producing said high starting torque may also consist of a squirrel cage of non-ferrous metal surrounding the cylindrical ferrite magnet.

By the provision of this disc of magnetic material or this squirrel cage a high starting torque can be obtained provided that the dimensions of these additional elements are properly calculated.

In the case of a disc this requirement is particularly easy to meet since it can be obtained by cutting the disc from strip stock of special cobalt steel. Thus, the starting torque may be increased by simply increasing either the number of discs added to the cylindrical ferrite magnet or the size of the squirrel cage.

Moreover, if a squirrel cage is used in conjunction with the ferrite rotor, under synchronous conditions the motor will operate in a practically pulse-free manner due to the fact that the squirrel cage acts as an oscillation damper.

In order to afford a clearer understanding of this invention and of the manner in which the same may be carried out in practice, various forms of embodiment thereof will be described hereinafter by way of example with reference to the attached drawings in which.

Figure 1:
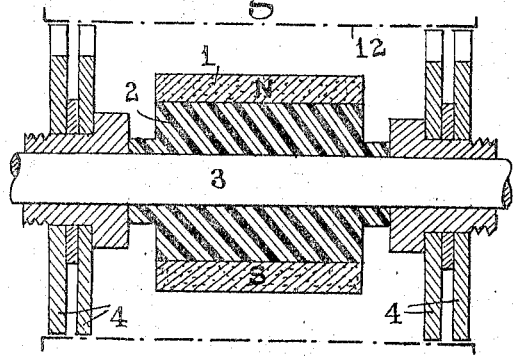
FIGURE 1 is a longitudinal diagrammatic section showing the rotor of a synchronous motor constructed according to the teachings of this invention.
Figure 2:
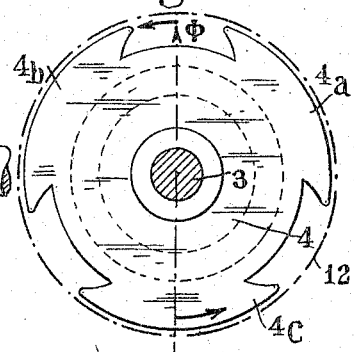
FIGURE 2 is an end view of the same rotor, as seen from the left-hand side of FIGURE 1.

Referring first to FIGURES 1 and 2, the rotor of the synchronous motor illustrated therein comprises a cylindrical magnet 1 made from a material such as ferrite which is so magnetized as to have an even number of alternating north-south poles along its periphery. In the example illustrated in the figure this magnet is bipolar and comprises two diametrally opposite N and S poles. This magnet 1 is connected through a hub 2 of non-magnetic material, for example a suitable plastic composition, to a shaft 3.

When this magnet 1 is disposed within the magnetic flux of a rotary field $\Phi$ produced by a suitable stator shown diagrammatically by the chain-dotted lines 12, it develops a relatively high synchronous driving torque. This torque may be calculated or adjusted at will by varying the dimensions, such as the diameter and length of the ferrite magnet 1 with a view to produce a more or less important remanent flux.

To obtain a relatively high starting torque there is provided according to the present invention one or a plurality of discs 4 carried by the rotor shaft 3. The rotor illustrated in FIGURE 1 comprises four discs of this type but obviously this number should not be construed as limiting the present invention since it can be selected as a function of the desired starting torque. Each disc 4 is made preferably from cobalt- or cobalt-vanadium rolled magnetic steel.

Each disc is cut from a steel strip or blank so as to constitute a spider-shaped or star-shaped member comprising at least three arms $4a$, $4b$ and $4c$. The reasons why this three-armed spider configuration produces a clean start, without any hesitation nor dead-center stoppage of the rotor, will be explained presently with reference to FIGURES 5 to 7 of the drawings.

Figure 3:
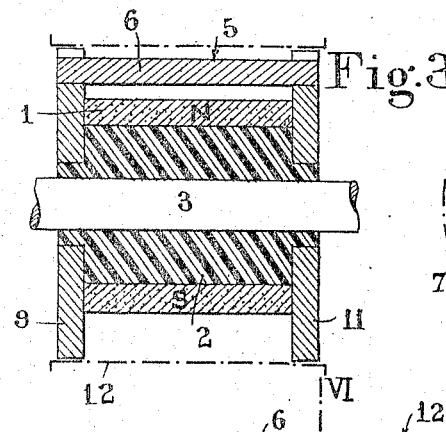
FIGURE 3 is a view similar to FIGURE 1 but showing a modified form of embodiment of the rotor.
Figure 4:
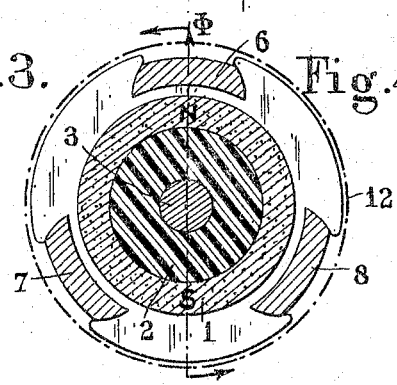
FIGURE 4 is a cross-sectional view of the rotor of FIGURE 3.

In the alternate form of embodiment illustrated in FIGURES 3 and 4, a squirrel cage designated in general by the reference numeral 5 is rotatably connected to the cylindrical ferrite magnet 1. This squirrel cage 5 is made from non-ferrous metal and comprises three longitudinal bars 6, 7 and 8 carried by short-circuiting end flanges 9, 11 also of non-ferrous metal which are rotatably solid with the rotor shaft 3. The invention is not limited by this number of bars since a considerably higher number of bars may be contemplated in the case of medium power-rating synchronous motors.

This squirrel cage 5 permits of avoiding not only the insufficient starting torque frequently observed in single-phase synchronous motors but also the well-known pumping effects produced under synchronous conditions, as well as the rotor oscillations in the case of a pulse energization of the stator winding. In this last instance the squirrel cage 5 acts as an oscillation damper.

The three bars 6, 7 and 8 of the squirrel cage 5 which are disposed externally of the ferrite rotor 1 are press-crimped on the flanges 9 and 11 consisting more particularly of copper discs in which three notches spaced 120 degrees from each other are formed to receive the bar ends as shown in FIGURE 4.

These bars 6, 7 and 8 may be mounted either parallel to the axis of rotation and have therefore a substantially rectangular configuration, or inclined in relation to said axis so as to have a helical development in the gap surface.

Now reference will be made to FIGURES 5 to 7 of the drawings to describe a specific form of embodiment of a synchronous motor having the desired self-starting characteristic under load, which is derived from a well-known type of single-phase two-pole asynchronous motor with phase-displacement rings.

It is known that, as a rule, in motors of this type it is endeavoured to decompose or divide the total energizing flux into two fluxes shifted by 90° in time and space so as to produce a magnetic field as constant as possible in the gap.

If in a motor of this type a two-pole rotor consisting of a magnetized ferrite rotor on a shaft merging into a diameter is used, it will be observed that a magnetic falling into step takes place, thus preventing the motor from starting. On the other hand, it is not possible under practical conditions to balance the two elementary fluxes and the resulting rotary field is always elliptical.

To obtain a perfect rotary field in a motor of this type and permit if necessary the operation of the motor as a pulse motor, there is provided, according to complementary features of this invention, on the one hand a triangular distribution of the induction magnetic flux under the main poles and on the other hand an angular shift of 60 degrees instead of 90 degrees between the elementary fluxes.

Figure 6:
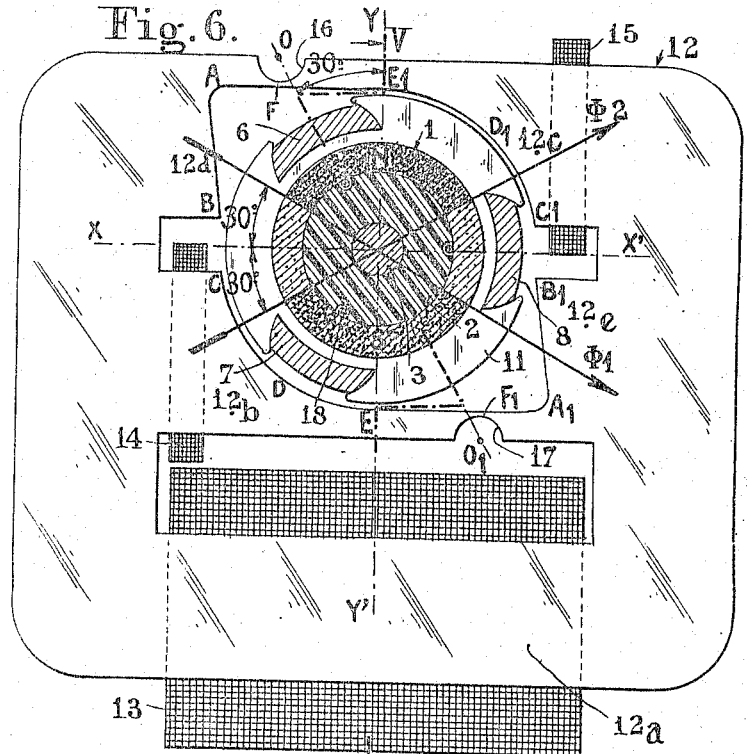
FIGURE 6 is a cross-sectional view of the same motor, taken upon the line VI—VI of FIGURE 5.
Figure 7:
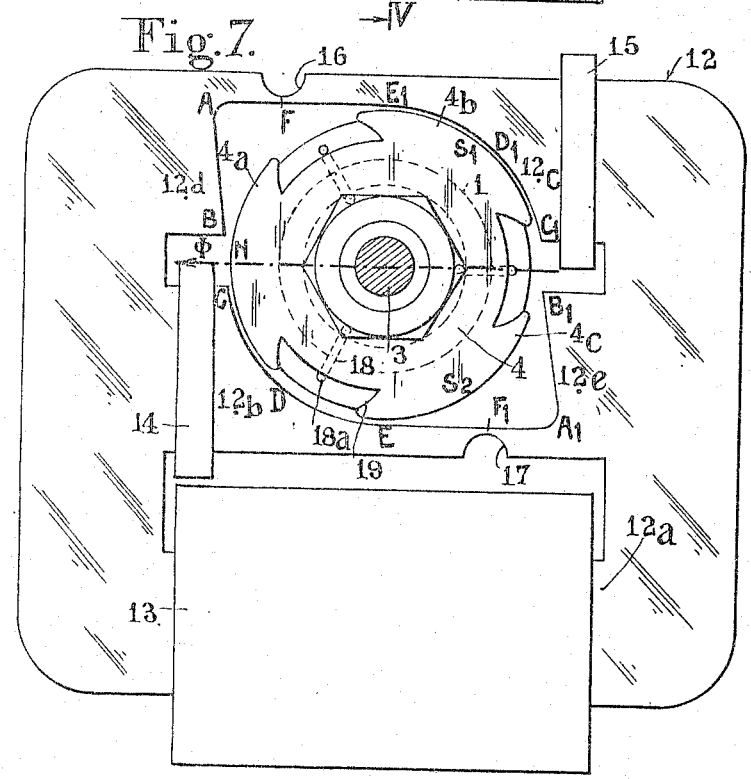
FIGURE 7 is a side elevational view of the motor illustrated in FIGURE 5.

This result is obtained by means of a special cutting configuration of the stator laminations 12, as clearly shown in FIGURES 6 and 7 of the drawings. In these figures, it will be seen that the stator laminations constitute a closed magnetic circuit carrying on the arm 12a a winding 13 producing the energizing magnetic flux. The stator laminations are so cut as to provide a first arm 12b and a second arm 12c carrying respectively phase shift rings 14, 15, and another pair of arms 12d, 12e without phase shift rings.

In FIGURE 6 it will be seen that the cross-sectional configuration of the aperture formed in the stator laminations 12, which constitutes the magnetic gap in which the rotor is mounted, comprises on the one hand two circular arcs CDE and $C_1D_1E_1$ disposed symmetrically in relation to the longitudinal axis of the rotor, and on the other hand two lozenge portions $BAE_1$ and $B_1A_1E_1$ disposed also symmetrically in relation to the longitudinal axis of the rotor. The vertex angle $BAE_1$ of each lozenge-shaped portion may be slightly inferior to 90 degrees and in certain cases it may even be equal to 90 degrees. On the other hand the vertices A and $A_1$ are preferably rounded to facilitate the cutting operation.

It may be emphasized that in an asymmetric circuit of the above-described type the phase displacement rings 14 and 15 can occupy only the positions shown in the drawing, that is, on the arms 12b and 12c, and that they cannot under any circumstance be placed on the other arms 12d and 12e, as contrasted with conventional circuit arrangements wherein the phase shift rings can be mounted indifferently in both positions according to the desired direction of rotation.

The purpose of the asymmetric disposition of the stator magnetic circuit is firstly to reduce the component $\Phi_1$ of the main flux which, due to the fact that it is not retarded like the other component $\Phi_2$ by the presence of the phase shift rings 14 and 15, is always superior to this component $\Phi_2$ if its magnetic-gap resistance is the same.

On the other hand, to prevent the flux component $\Phi_1$ from flowing through the magnetic shunt consisting of the arm $AE_1D_1$ or $A_1ED$ instead of through the rotor, there are provided at points O, $O_1$ disposed externally of the magnetic circuit on a line inclined by 30° in relation to the vertical axis YY', two semi-circular notches 16 and 17 which leave only narrow cross-sectional passages F and $F_1$ in the magnetic laminations, whereby these passages are magnetically over-saturated.

Besides, to facilitate the passage of the magnetic flux component $\Phi_2$ through the rotor, a relatively wide area concentric with the rotor is left for taking the flux, this area corresponding to the aforesaid circular arcs CDE and $C_1D_1E_1$ extending over practically 90 degrees.

The fluxes $\Phi_1$ and $\Phi_2$ can be balanced very rapidly during tests by disposing on a shuttle-type rotor a test coil comprising for example 100 turns of which the voltage measured across the terminals under open-circuit conditions gives a value proportional to $\Phi_1$ when this coil is disposed coaxially to this flux and forms an angle of 30 degrees with the horizontal axis XX', and a voltage proportional to the flux $\Phi_2$ when this coil is disposed along the axis $\Phi_2$ symmetric to axis $\Phi_1$ in relation to the horizontal axis XX'.

Of course, the flux component $\Phi_1$ may be reduced by filing the portions AB and $A_1B_1$ of the magnetic circuit. To reduce the flux component $\Phi_2$, if desired, or to increase its angle of phase displacement in relation to said component $\Phi_1$, short-circuit phase-displacement copper rings must be placed at 14 and 15, these rings having an increasingly thicker cross-section to counteract the passage of flux $\Phi_2$.

In this magnetic circuit it will be observed during actual tests that the magnetic neutral line lies not at YY' but at $OO_1$. This is deliberate and necessary to ensure a satisfactory operation when the stator coil 13 is fed with rectangular signals. In fact it will be noted that the ferrite rotor 1 would synchronize magnetically with the line YY' if this care were not taken, and that this magnet is in the dead center position and will not start when the voltage is applied.

The configuration of the magnetic gap in portions FAB and $F_1A_1B_1$ affords a triangular distribution of the magnetic flux to F and B on the one hand and to $F_1$ and $B_1$ on the other hand, with a minimum flux at F and $F_1$ and a maximum flux at B and $B_1$.

The advantage resulting from this triangular and gradual flux distribution lies of course in the fact that the ferrite rotor 1 is gradually caused to take substantially the axial position XX'. At this time the flux $\Phi_2$ shifted by 60 degrees in time and space causes a 60-degrees rotation of the ferrite rotor in the same direction; then, as the flux is inverted in the energizing coil the fluxes $\Phi_1$ and $\Phi_2$ of FIGURE 6 are inverted in turn and thus firstly another magnetic attraction takes place in the triangular flux distribution gap $F_1A_1B_1$ followed by another pulse due to the inverted flux of $\Phi_2$ in portion $C_1D_1E_1$.

This requires a 120-degree magnetization of the ferrite rotor as shown diagramatically in FIGURE 6 in which the N and S poles are designated by thicker dotted lines than the non-magnetized portions of the rotor.

It is clear that by causing the various intervening parameters such as the gap variation in zones FAB and $F_1A_1B_1$ as well as the value of the phase-shift of flux $\Phi_2$ as a function of the magnitude of the phase-displacement rings 14 and 15, it is possible to obtain two fluxes $\Phi_1$ and $\Phi_2$ identical as to their efficient values which are shifted by 60 degrees in time and space.

Although a stator magnetic circuit constructed in the manner set forth hereinabove permits of starting a two-pole ferrite rotor always in the same direction, given by the direction of flux $\Phi_1$ towards the flux $\Phi_1$ corresponding to the 60-degree lag of flux $\Phi_2$ in relation to flux $\Phi_1$, this is not sufficient for starting the rotor under load. Therefore, in the motor illustrated in FIGURES 5 to 7 there is provided the combination of characteristics described hereinabove with reference to FIGURES 1 to 4 of the drawings.

To this end the ferrite rotor 1 is surrounded by a squirrel cage 5 consisting of three longitudinal bars 6, 7 and 8 of non-ferrous metal, mounted in two parallel short-circuiting end flanges or discs 9, 11, also made of non-ferrous metal.

It may be noted that the diameter of the ferrite rotor 1 is substantially smaller than the diameter of the aperture or bore formed in the stator 12. This is necessary in order to reduce or limit the magnetic synchronization and de-synchronization of the ferrite rotor 1 which would on the one hand counteract the starting of the motor and on the other hand introduce pulsations or oscillations in the rotor speed under sychronous conditions.

On the other hand, as a rule the diameter of the ferrite rotor 1 will be selected to have the value of the stator diameter multiplied by 0.8 in the case of small motors and by 0.9 in the case of larger motors.

Figure 5:
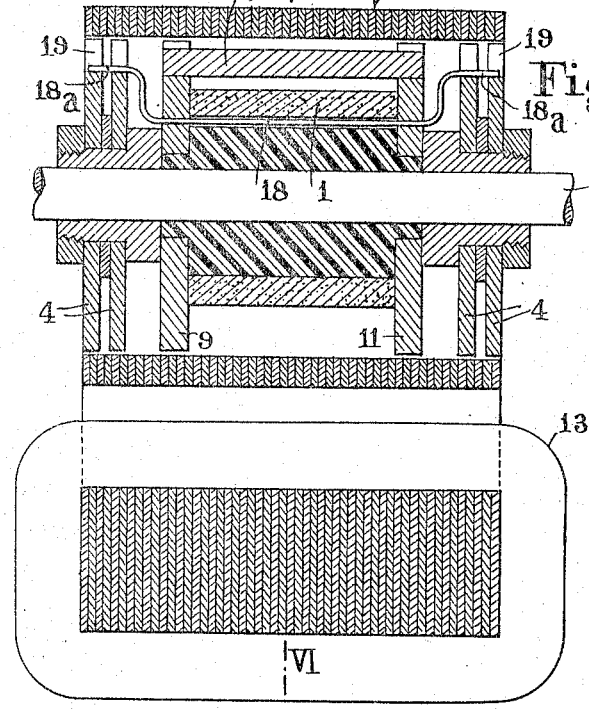
FIGURE 5 is a longitudinal diagrammatic section showing a synchronous motor adapted to start under heavy load, with phase-displacement rings, the section being taken upon the line V—V of FIGURE 6.

In order further to reinforce the starting torque, there are provided, in a motor of the type shown in FIGURES 5 to 7, four discs 4 of magnetic steel cut to the configuration shown in FIGURE 4 and secured on the rotor shaft 3.

These discs 4 may advantageously be cut from strip or like stock by using the same tool as the one provided for cutting the short-circuited flanges 9 and 11 of squirrel cage 5.

Besides, it will be noted that the star- or spider configuration of discs 4 with three arms 4a, 4b and 4c enables the motor to start without any hesitation nor dead center. In fact, when subjected to any diametral flux (see FIGURE 7) the disc 4 is magnetized in a parallel direction but with a north pole on one side and two south poles $S_1$ and $S_2$, shifted by 120°, on the other side. Any rotation of the induction flux, even an instantaneous one, will immediately produce a corresponding rotation of disc 4, one of the poles $S_1$ or $S_2$ being attracted while the other pole is repelled; now it is obvious that a plain cobalt disc without three-armed cuttings would remain in its dead center position.

To obtain the requisite starting torque the necessary number of magnetic steel discs 4 are stacked on either side of the ferrite rotor 1, care being taken however that a gap of at least 0.08" is left on either side of the ferrite cylinder 1, this gap being partially filled by the closing washers 9 and 11 of the squirrell cage 6. The diameter of said discs 4 is calculated to be as high as possible, within the limits of the permissible play currently admitted between the rotor and stator in the case of small electrical machines.

The ferrite rotor 1 produces a pre-magnetization of said discs 4, which is limited by gaps of at least 0.08" provided as set forth hereinabove, but facilitates the starting of the motor.

In the case of motors of relatively greater power rating, the starting may be further facilitated by mounting the ferrite rotor 1 for loose rotation on its shaft 3 and providing an elastic driving connection between this rotor 1 and the discs 4 rigidly assembled with the shaft 3. In FIGURE 5 the ferrite rotor 1 is connected to the discs 4 through a plurality of steel springs 18 (such as steel wire) of which the cranked ends 18a are inserted into notches 19 formed between the various arms 4a, 4b and 4c of discs 4. These discs 4 are rigidly connected to the shaft 3 for example by press-crimping or fitting. The pulsatory torque of the ferrite rotor 1, during the starting period, is thus damped out by the springs 18 which absorb the oscillations during the favourable phases without retarding the starting torque produced by the discs 4.

The squirrel cage 5 is also adapted to act as a damping member during the oscillation phases of the torque while adding its inherent torque during the starting period.

The relatively wide bars 6, 7 and 8 of the squirrel cage 5 also capable of damping out the flux harmonics appearing in these motors and this property enables them to eliminate the effects of hypo-synchronous magnetic coupling or torque gaps as currently observed in small motors not provided with these devices.

Of course, the specific forms of embodiment of this invention which are described hereinabove are given by way of example only and should not be construed as limiting this invention since many modifications and variations may be brought thereto without departing from the spirit and scope of the invention as set forth in the appended claims.

What I claim is:

1. Synchronous motor comprising in combination a rotor comprising a shaft, an annular permanent magnet rigid with said shaft, said annular permanent magnet having a radial magnetization forming a north and a south pole each extending respectively along an angle of 120 degrees, two three-armed magnetically retentive elements disposed at spaced angular intervals along the rotor periphery, said elements being disposed on either side of said annular permanent magnet and mounted for loose rotation on said rotor shaft, means providing an elastic coupling between said annual permanent magnet and said three-armed elements to permit an angular free motion of predetermined amplitude between said annular permanent magnet on the one hand and said two three-armed elements on the other hand, and a stator comprising a magnetic core, an excitation coil carried by said core, a pair of first arms and a pair of second arms at the ends of said core, said pairs of first and second arms registering with each other and having pole faces at their ends to determine the magnetic gap in which said rotor is located, said first pair of arms being disposed symmetrically to each other in relation to the axis of rotation and said second pair of arms being also disposed symmetrically to each other in relation to said axis of rotation, a phase-shift ring carried by each one of said first arms, said pair of first arms having at their ends cylindrical pole faces having in turn a cross-sectional configuration in the form of circula rarcs about 90-degrees long and concentric to the rotor axis, said pair of second arms having end pole faces of partially diamond-shaped cross-sectional configuration which merge into said pair of circular arcs, whereby said magnetic gap taken as a whole has the shape of a lozenge having two rounded opposed vertices.

2. Synchronous motor as set forth in claim 1 including a squirrel cage winding rigidly mounted on said annular permanent magnet.

References Cited by the Examiner

UNITED STATES PATENTS

| | | | |
|---|---|---|---|
| 2,072,894 | 3/1937 | Lilja | 310—163 |
| 2,153,775 | 4/1939 | Poole | 310—163 |
| 2,344,401 | 3/1944 | Finch | 310—163 |
| 2,432,436 | 12/1947 | Morrill | 310—156 |
| 2,492,207 | 12/1949 | Ballentine | 310—172 |
| 2,525,456 | 10/1950 | Merrill | 310—156 |
| 3,207,935 | 9/1965 | Mosovsky et al. | 310—172 |

MILTON O. HIRSHFIELD, *Primary Examiner.*

L. L. SMITH, *Assistant Examiner.*